(12) United States Patent
Kobayashi et al.

(10) Patent No.: US 6,303,675 B1
(45) Date of Patent: Oct. 16, 2001

(54) SILICONE RUBBER COMPOSITION

(75) Inventors: Hideki Kobayashi; Hiroshi Honma; Toru Masatomi, all of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/507,612

(22) Filed: Feb. 21, 2000

(30) Foreign Application Priority Data

Feb. 26, 1999 (JP) .................................................. 11-049835

(51) Int. Cl.$^7$ .............................. C08L 83/08; C08L 83/12; C08G 77/24; C08G 77/14

(52) U.S. Cl. ........................ 524/263; 524/261; 524/265; 524/267; 524/268; 524/462; 524/545; 524/588; 525/474; 528/25; 528/26; 528/29; 528/31; 528/42

(58) Field of Search ................................ 528/25, 26, 27, 528/31, 42; 524/261, 265, 266, 267, 268, 462, 45, 588, 263; 525/474

(56) References Cited

U.S. PATENT DOCUMENTS

| | | | | |
|---|---|---|---|---|
| 4,748,225 | * | 5/1988 | Yohioka et al. | 528/26 |
| 5,047,491 | * | 9/1991 | Saho et al. | 528/15 |
| 5,300,239 | * | 4/1994 | Ozaki et al. | 252/86 |
| 5,895,794 | * | 4/1999 | Berg et al. | 523/217 |
| 5,908,950 | * | 6/1999 | Cooke et al. | 556/448 |
| 5,945,471 | * | 8/1999 | Morita et al. | 524/409 |
| 6,063,487 | * | 5/2000 | Azechi et al. | 428/325 |
| 6,184,329 | * | 2/2001 | Jost et al. | 528/15 |

FOREIGN PATENT DOCUMENTS

| | | |
|---|---|---|
| 60-36171 | 2/1985 | (JP) . |
| 5-117530 | 5/1993 | (JP) . |
| 9-226529 | 9/1997 | (JP) . |

* cited by examiner

*Primary Examiner*—Robert Dawson
*Assistant Examiner*—Jeffrey B. Robertson
(74) *Attorney, Agent, or Firm*—William F. Boley; James L. De Cesare

(57) ABSTRACT

A silicone rubber composition comprising 0.01 to 50 weight percent of a perfluoroalkyl group-containing polydiorganosiloxane having on a side chain (F1) an organic group selected from the group consisting of polyoxyalkylene group-containing organic groups, $C_{12}$ or higher alkyl group, and polydialkylsiloxane chain-containing organic groups, and having of a side chain or at a molecular chain terminal (F2) a perfluoroalkyl group-containing organic group described by the general formula $$F(CF_2)_a\text{—}R^1\text{—},$$

where $R^1$ is selected from the group consisting of an alkylene group, an alkyleneoxyalkylene group, and a group in which =CO or —COO— is present in an alkylelne chain, and a is an integer of at least 3, and having a weight average molecular weight of at least 1000.

2 Claims, No Drawings

SILICONE RUBBER COMPOSITION

BACKGROUND OF INVENTION

The present invention relates to a silicone rubber composition, and more particularly relates to a silicone rubber composition that can be made into a silicone rubber with superior water and oil repellency after curing. Silicone rubbers whose main component is a dimethylpolysiloxane have excellent weather resistance, heat resistance, cold resistance, and so on, and are used in applications that demand these characteristics. A drawback to this type of silicone rubber, however, is that when it is used repeatedly for an extended period, it loses its rubber elasticity, lubricity decreases, and it wears away. This material is therefore not always satisfactory in applications that demand such characteristics, such as the rubber inserts of automobile wiper blades, rubber members used for printing type, and keyboard pad rubber members. Consequently, there have been attempts at enhancing the stress durability, lubricity, and so on of silicone rubber by introducing fluorine atom-containing organic groups into the organopolysiloxanes that make up these silicone rubbers. For instance, Japanese Laid-Open Patent Application H9-226529 proposes an automobile wiper blade composed of a silicone rubber whose main component is an organopolysiloxane containing γ-trifluoropropyl groups. There have also been attempts at enhancing the stress durability, lubricity, and so on of silicone rubber by adding a fluoro-resin powder to the silicone rubber. For instance, Japanese Laid-Open Patent Application H5-117530 proposes an automobile wiper blade composed of a silicone rubber in which a fluoro-resin powder is added to a silicone rubber. Japanese Laid-Open Patent Application S60-36171 proposes a silicone rubber that comprises a fluoro-resin powder added to a silicone rubber, and that is suited for printing type rubber members. All of these silicone rubbers, however, were inadequate in terms of their water and oil repellency, and were therefore not completely satisfactory in certain applications.

The inventors arrived at the present invention as a result of diligent study into the above problems. Specifically, it is an object of the present invention to provide a silicone rubber composition that can be made into a silicone rubber with superior water and oil repellency after curing.

SUMMARY OF INVENTION

The present invention is a silicone rubber composition characterized by containing the following perfluoroalkyl group-containing polydiorganosiloxane in an amount of 0.01 to 50 wt %: a perfluoroalkyl group-containing polydiorganosiloxane having on a side chain (F1) an organic group selected from the group consisting of polyoxyalkylene group-containing organic groups, $C_{12}$ or higher alkyl groups, and polydialkylsiloxane chain-containing organic groups, and having on a side chain or at a molecular chain terminal (F2) a perfluoroalkyl group-containing organic group described by the general formula

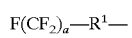

where $R^1$ is selected from the group consisting of an alkylene group, an alkyleneoxyalkylene group, and a group in which =CO or —COO— is present in an alkylene chain, and a is an integer of at least 3, and having a weight average molecular weight of at least 1000.

DESCRIPTION OF INVENTION

The present invention is a silicone rubber composition characterized by containing the following perfluoroalkyl group-containing polydiorganosiloxane in an amount of 0.01 to 50 wt %: a perfluoroalkyl group-containing polydiorganosiloxane having on a side chain (F1) an organic group selected from the group consisting of polyoxyalkylene group-containing organic groups, $C_{12}$ or higher alkyl groups, and polydialkylsiloxane chain-containing organic groups, and having on a side chain or at a molecular chain terminal (F2) a perfluoroalkyl group-containing organic group described by the general formula

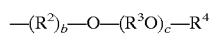

where $R^1$ is selected from the group consisting of an alkylene group, an alkyleneoxyalkylene group, and a group in which =CO or —COO— is present in an alkylene chain, and a is an integer of at least 3, and having a weight average molecular weight of at least 1000.

Here, the polyoxyalkylene group-containing organic groups of (F1) are described by the general formula:

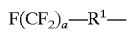

where $R^2$ is a divalent hydrocarbon group, $R^3$ is a divalent hydrocarbon group having 1 to 4 carbon atoms, $R^4$ is selected from the group consisting of a hydrogen atom, a monovalent hydrocarbon group, and an acyl group, b is 0 or 1, and c is an integer from 1 to 300, and preferably an integer of at least 5. Examples of $C_{12}$ or higher alkyl groups include n-dodecyl groups, n-tetradecyl groups, n-hexadecyl groups, and n-octadecyl groups. Examples of polydialkylsiloxane chain-containing organic groups include alkyleneoxyalkylene groups or alkylene groups bonded to a polydimethylsiloxane chain. It is preferable here for the degree of polymerization of the polydialkylsiloxane to be at least 5. Examples of such polydialkylsiloxanes include compounds described by the following general formula.

(Chemical Formula 1)

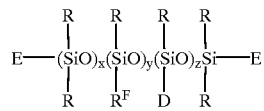

In the formula 1, R is a substituted or unsubstituted monovalent hydrocarbon group, specific examples of which include $C_1$ to $C_{30}$ alkyl groups, alkenyl groups, aryl groups, and arylalkyl groups. Of these, methyl and phenyl groups are typical. $R^F$ is a perfluoroalkyl group-containing organic group described by the above-mentioned general formula:

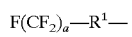

where $R^1$ is selected from a group consisting of an alkylene group, an alkyleneoxyalkylene group, and a group in which =CO or —COO— is present in an alkylene chain, and a is an integer of at least 3. Ethylene and propylene groups are preferred as the alkylene group of $R^1$, and examples of the alkyleneoxyalkylene group of $R^1$ include the ethyleneoxyethylene group, ethyleneoxypropylene group, and propyleneoxypropylene group. In formula 1, D is an organic group selected from the group consisting of polyoxyalkylene group-containing organic groups, $C_{12}$ or higher alkyl groups, and polydialkylsiloxane chain-containing organic groups. In formula 1, E is a group selected from among R, $R^F$, and D, x is a number from 0 to 500, y is a number from 1 to 500, and z is a number from 1 to 500. It is preferred for (x+y+z) to be between 2 and 1500. When at least one of the molecular chain terminals E (F2) of this polydiorganosiloxane is a perfluoro group-containing organic group, y may be 0. It is preferable that the perfluoro group-containing organic group of (F2) and the non-fluorine-based substituents of (F1) are arranged as a graft chain with respect to the siloxane main chain.

The compounds described by the following chemical structural formulas are examples of such a perfluoroalkyl group-containing polydiorganosiloxane.

(Chemical Formula 2)

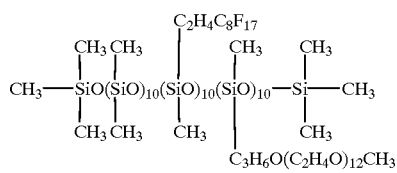

(Chemical Formula 3)

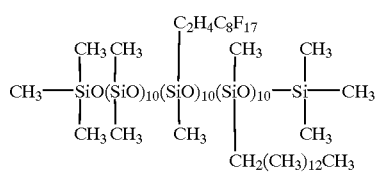

(Chemical Formula 4)

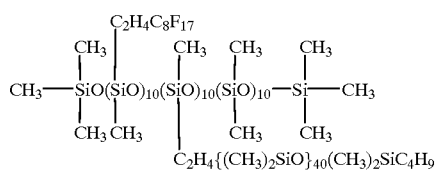

(Chemical Formula 5)

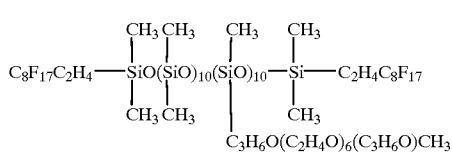

(Chemical Formula 6)

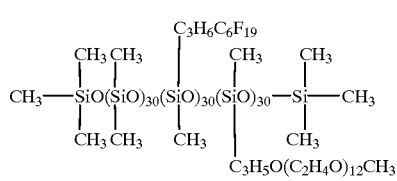

(Chemical Formula 7)

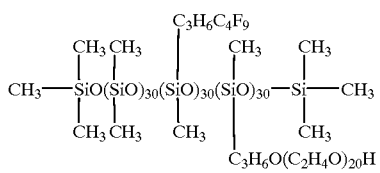

(Chemical Formula 8)

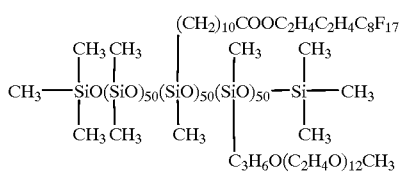

This perfluoroalkyl group-containing polydiorganosiloxane can be manufactured, for example, by heating an alkenyl group-containing polyoxyalkylene compound described by formula:

$$CH_2=CHCH_2(OC_2H_4)_{10}H,$$

such as an α-olefin or other such alkenyl group-containing hydrocarbon compound, or a vinyl group-containing dimethylpolysiloxane such as:

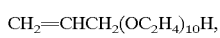

where $R^2$ is a monovalent hydrocarbon group, in the presence of chloroplatinic acid or another such catalyst for a hydrosilylation reaction and, if necessary, in the presence of an organic solvent so that this compound is subjected to an addition reaction to a polysiloxane described by the following formula:

(Chemical Formula 9)

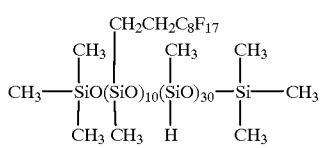

The proportion of the silicone rubber composition accounted for by this perfluoroalkyl group-containing polydiorganosiloxane is between 0.01 and 50 wt %, and preferably between 0.1 and 30 wt %, and even more preferably between 0.2 and 20 wt %.

The silicone rubber composition of the present invention contains the above-mentioned perfluoroalkyl group-containing polydiorganosiloxane in an amount of 0.01 to 50 wt %, and becomes a silicone rubber upon curing. The silicone rubber composition of the present invention is obtained by adding the above-mentioned perfluoroalkyl group-containing polydiorganosiloxane to a conventional silicone rubber composition. The silicone rubber composition to which the perfluoroalkyl group-containing polydiorganosiloxane is added can be a silicone rubber composition that is cured by an addition reaction, a silicone rubber composition that is cured by an organic peroxide, or a silicone rubber composition that is cured by a condensation reaction.

A typical example of an addition reaction-curing silicone rubber is a composition composed of the following components.

(a-1) 100 weight parts of a polydiorganosiloxane having at least two alkenyl groups per molecule and having a viscosity of at least 40 mPa·s at 25° C., (b-1) 0.5 to 90 weight parts of an organohydrogenpolysiloxane having at least three silicon atom-bonded hydrogen atoms per molecule and having a viscosity of 1 to 1000 mPa·s at 25° C., (c-1) 1 to 90 weight parts of a reinforcing filler, (d-1) 0.1 to 1000 weight parts of a platinum-based catalyst as the amount of platinum metal per 1,000,000 weight parts of components (a) plus (b).

This addition reaction-curing silicone rubber composition will now be described. The main component of the addition reaction-curing silicone rubber composition is the polydiorganosiloxane component (a-1). Examples include a dimethylpolysiloxane terminated at both ends of the molecular chain with a dimethylvinylsiloxy group, a dimethylsiloxane.methylvinylsiloxane copolymer terminated at both ends of the molecular chain with a dimethylvinylsiloxy group, a dimethylsiloxane.methylphenylsiloxane copolymer terminated at both ends of the molecular chain with a dimethylvinylsiloxy group, a methylvinylpolysiloxane terminated at both ends of the molecular chain with a trimethylsiloxy group, a dimethylsiloxane.methylvinylsiloxane copolymer terminated at both ends of the molecular chain with a trimethylsiloxy group, a dimethylsiloxane.methyl(5-hexenyl)siloxane copolymer terminated at both ends of the molecular chain with a trimethylsiloxy group, a dimethylsiloxane.methylvinylsiloxane.methylphenylsiloxane copolymer terminated at both ends of the molecular chain with a dimethylvinylsiloxy group, a methylvinylpolysiloxane terminated at both ends of the molecular chain with a dimethylhydroxy group, and a dimethylsiloxane.methylvinylsiloxane copolymer terminated at both ends of the molecular chain with a dimethylhydroxysiloxy group.

In this addition reaction-curing silicone rubber composition, the organohydrogenpolysiloxane component (b-1) is a crosslinking agent, and must have at least two hydrogen atoms substituted on silicon atoms per molecule and a viscosity of at least 40 mPa·s at 25° C. A typical example of component (b-1) is described by the average unit formula $R^5_b SiO_{(4-b)/2}$, where $R^5$ is a hydrogen atom or a monovalent hydrocarbon group other than an alkenyl group, and b is a number from 1.50 to 3.00. In the above formula, $R^5$ is a hydrogen atom or a monovalent hydrocarbon group other than an alkenyl group, and at least two and preferably 3 of the $R^5$ groups in the organohydrogenpolysiloxane expressed by the above formula must be hydrogen atoms. Specific examples of the monovalent hydrocarbon group of $R^5$ include alkyl groups such as methyl, ethyl, propyl, and butyl; aryl groups such as phenyl, tolyl, and xylyl; aralkyl groups such as benzyl and phenethyl; and halogen substituted alkyl groups such as 3-chloropropyl and 3,3,3-trifluoropropyl group. Of these, the methyl group is preferred. There are no particular restrictions on the molecular structure of component (b-1), but examples include linear, cyclic, resin, and partially branched linear. When component (b-1) has a linear molecular structure, specific examples of the molecular chain end groups include trimethylsiloxy, dimethylphenylsiloxy, dimethylhydrogensiloxy, and dimethylhydroxysiloxy. The viscosity of component (b-1) at 25° C. must be between 1 and 1000 mPa·s, with a range of 5 to 500 mPa·s being preferable. This is because component (b-1) will tend to volatilize and the resulting silicone rubber composition will be unstable if the viscosity of component (b-1) at 25° C. is less than 1 mPa·s. However, if the viscosity of component (b-1) is over 1000 mPa·s the resulting silicone rubber composition will take too long to cure, among other disadvantages.

Examples of component (b-1) include a methylhydrogenpolysiloxane terminated at both ends of the molecular chain with a trimethylsiloxy group, a dimethylsiloxane.methylhydrogensiloxane copolymer terminated at both ends of the molecular chain with a trimethylsiloxy group, a dimethylsiloxane terminated at both ends of the molecular chain with a dimethylhydrogensiloxy group, a dimethylsiloxane methylhydrogensiloxane copolymer terminated at both ends of the molecular chain with a dimethylhydrogensiloxy group, a cyclic methylhydrogenpolysiloxane, and a cyclic methylhydrogensiloxane.dimethylsiloxane copolymer.

The amount in which component (b-1) is added to this addition reaction-curing silicone rubber composition must be between 0.5 and 90 weight parts per 100 weight parts of component (a-1), with a range of 1 to 80 weight parts being preferred. This is because the resulting silicone rubber composition will not cure sufficiently if component (b-1) is contained in an amount less than 0.5 weight part, and the physical strength of the resulting silicone rubber composition will suffer if this amount exceeds 90 weight parts.

Conventional reinforcing fillers used in silicone rubber compositions can be used as the reinforcing filler of component (c-1) in this addition reaction-curing silicone rubber composition. The reinforcing filler can be fumed silica obtained by a dry process, a calcined silica micropowder, or a precipitated silica micropowder obtained by a wet process, or can be a hydrophobic silica micropowder obtained by treating the surface of one of the above types of silica with dimethylchlorosilane or hexamethyldisilazane. These silica micropowders should preferably have a BET specific surface area of at least 50 $m^2/g$, with a range of 100 to 400 $m^2/g$ being particularly favorable.

The amount in which component (c-1) is contained in this addition reaction-curing silicone rubber composition is between 1 and 90 weight parts per 100 weight parts of component (a-1), with a range of 1 to 80 weight parts being preferred.

The platinum-based catalyst of component (d-1) is a curing catalyst that works by promoting the addition reaction of component (a-1) and component (b-1). Examples of component (d-1) include an alcohol solution of chloroplatinic acid, a complex of chloroplatinic acid and an olefin, a complex of chloroplatinic acid and divinyltetramethyldisiloxane, a complex of chloroplatinic acid and a ketone, platinum carried on an alumina micropowder, and platinum carried on a silica micropowder. The amount in which this component is contained is 1 to 1000 weight parts, as platinum metal, per 1,000,000 weight parts of components (a) and (b) combined.

In addition to the above-mentioned components (a-1) to (d-1), this addition reaction-curing silicone rubber composition can also contain an addition reaction inhibitor in order to impart room-temperature storage stability to the composition. Specific examples of addition reaction inhibitors include 3-methyl-1-buten-3-ol, 3,5-dimethyl-1-hexyn-3-ol, 3-methyl-1-penten-3-ol, phenylbutanol, and other such alkynyl alcohols; and 3-methyl-3-penten-1-yne, 3,5-dimethyl-1-hexyn-3-yne, benzotriazole, and cyclic methylvinylsiloxane. The amount of this component can be adjusted as desired, but is preferably between 0.001 and 5 weight parts per 100 weight parts of component (a-1).

The following composition is an example of an organic peroxide-curing silicone rubber composition useful in the present invention.

(a-2) 100 weight parts of a diorganopolysiloxane having at least two alkenyl groups per molecule (c-2) 1 to 90 weight parts of a reinforcing filler (d-2) 0.01 to 20 weight parts of an organic peroxide The main component of this organic peroxide-curing silicone rubber composition is the diorganopolysiloxane of component (a-2), which must have at least two alkenyl groups per molecule. A typical example of this component (a-2) is a compound described by the average unit formula $R^4_a SiO_{(4-a)/2}$, where $R^4$ is a monovalent hydrocarbon group and a is a number from 1.95 to 2.05. Specific examples of the monovalent hydrocarbon group $R^4$ include alkyl groups such as methyl, ethyl, propyl, and butyl; ary groups such as phenyl, tolyl, and xylyl; aralkyl groups such as benzyl and phenethyl; and halogen-substituted alkyl groups such as 3-chloropropyl and 3,3,3-trifluoropropyl. At least two of the $R^4$ groups in the organopolysiloxane expressed by the above formula must be alkenyl groups. It is preferable for the monovalent hydrocarbon groups other than alkenyl groups of $R^4$ to be methyl groups. In the above formula, a is a number from 1.95 to 2.05. There are no particular restrictions on the molecular structure of component (a-2), but examples include linear, cyclic, resin, and partially branched linear, with linear being preferred. It is preferable for the viscosity of the polydiorganosiloxane of component (a-2) at 25° C. to range from 100,000 mPa·s to a high-viscosity material in the form of gum, with the latter being particularly favorable. When component (a-2) has a linear molecular structure, specific examples of the molecular chain end groups thereof include trimethylsiloxy, dimethylvinylsiloxy, dimethylphenylsiloxy, and dimethylhydroxysiloxy.

Specific examples of the polydiorganosiloxane of component (a-2) include a dimethylpolysiloxane terminated at both ends of the molecular chain with a dimethylvinylsiloxy group, a dimethylsiloxane.methylvinylsiloxane copolymer terminated at both ends of the molecular chain with a dimethylvinylsiloxy group, a dimethylsiloxane.methylphenylsiloxane copolymer terminated at both ends of the molecular chain with a dimethylvinylsiloxy group, a methylvinylpolysiloxane terminated at both ends of the molecular chain with a trimethylsiloxy group, a dimethylsiloxane.methylvinylsiloxane copolymer terminated at both ends of the molecular chain with a trimethylsiloxy group, a dimethylsiloxane.methyl(5-hexenyl)siloxane copolymer terminated at both ends of the molecular chain with a trimethylsiloxy group, a dimethylsiloxane.methylvinylsiloxane.methylphenylsiloxane copolymer terminated at both ends of the molecular chain with a dimethylvinylsiloxy group, a methylvinylpolysiloxane terminated at both ends of the molecular chain with a dimethylhydroxy group, and a dimethylsiloxane.methylvinylsiloxane copolymer terminated at both ends of the molecular chain with a dimethylhydroxysiloxy group.

The reinforcing filler that is component (c-2) is the same as component (c-1) described for the above-mentioned addition reaction-curing silicone rubber composition, and examples thereof are the same.

Examples of the organic peroxide component (d-2) include benzoyl peroxide, p-methylbenzoyl peroxide, m-methylbenzoyl peroxide, dicumyl peroxide, di-tert-butyl peroxide, and 2,5-dimethyl-2,5-di(tert-butyl peroxy)hexane. The amount in which this component is added is usually between 0.01 and 20 weight parts per 100 weight parts of component (a-2).

The following composition is an example of a condensation reaction-curing silicone rubber composition useful in the present invention:

(a-3) 100 weight parts of a polydiorganosiloxane having at least two silanol groups or silicon atom-bonded hydrolyzable groups per molecule and having a viscosity of at least 40 mPa·s at 25° C., (b-3) 0.5 to 90 weight parts of an organosilane, or partial hydrolyzed condensate thereof, described by the general formula $R^5_e SiX_{4-e}$, where $R^5$ is a substituted or unsubstituted monovalent hydrocarbon group comprising 1 to 8 carbons, e is 0, 1, or 2, and X is a water-hydrolyzable group, (c-3) 1 to 90 weight parts of a reinforcing filler (d-3) 0.01 to 20 weight parts of a condensation reaction promoting catalyst The main component of the condensation reaction-curing silicone rubber composition is the polydiorganosiloxane component (a-3). The viscosity of component (a-3) at 25° C. must be at least 40 mPa·s and there must be at least two silanol groups or silicon atom-bonded hydrolyzable groups per molecule. A typical example of component (a-3) is described by the average unit formula $R^6_c SiO_{(4-c)/2}$, where $R^6$ is a monovalent hydrocarbon group or a silanol group, and c is a number of from 1.95 to 2.05. In the above formula, $R^6$ is a monovalent hydrocarbon group or a silanol group, and at least two of the $R^6$ groups in the polydiorganosiloxane molecules described by the above formula must be silanol groups or hydrolyzable groups. Specific examples of the monovalent hydrocarbon group of $R^6$ include alkyl groups such as methyl, ethyl, propyl, and butyl; alkenyl groups such as vinyl, allyl, butenyl, pentenyl, and hexenyl; aryl groups such as phenyl, tolyl, and xylyl; aralkyl groups such as benzyl and phenethyl; and halogen-substituted alkyl groups such as 3-chloropropyl and 3,3,3-trifluoropropyl. Of these, the methyl group is preferred. There are no particular restrictions on the molecular structure of component (a-3), but examples include linear, cyclic, resin, and partially branched linear, with linear being preferred. When component (a-3) has a linear molecular structure, specific examples of the molecular chain end terminal groups include the dimethylhydroxysiloxy group and the methylphenylhydroxysiloxy group. The viscosity of component (a-3) at 25° C. must be at least 40 mPa·s, and as to the upper limit thereof, any viscosity up to the form of a gum can be used.

Examples of the polydiorganosiloxane of component (a-3) include a dimethylpolysiloxane terminated at both ends of the molecular chain with a dimethylhydroxysiloxy group, a dimethylsiloxane.methylvinylsiloxane copolymer terminated at both ends of the molecular chain with a dimethylhydroxysiloxy group, a dimethylsiloxane.methylphenylsiloxane copolymer terminated at both ends of the molecular chain with a dimethylhydroxysiloxy group, a methylvinylpolysiloxane terminated at both ends of the molecular chain with a dimethylhydroxysiloxy group, a methylphenylpolysiloxane terminated at both ends of the molecular chain with a dimethylhydroxysiloxy group, a dimethylsiloxane.methyl(5-hexenyl)siloxane copolymer terminated at both ends of the molecular chain with a dimethylhydroxysiloxy group, a dimethylpolysiloxane terminated at both ends of the molecular chain with a dimethylmethoxy group, and a dimethylpolysiloxane terminated at both ends of the molecular chain with a methyldimethoxy group.

The organosilane or partial hydrolyzed condensate thereof that is component (b-3) acts as a crosslinking agent which serves to cure the composition of the present invention at room temperature. In the formula, e is 0, 1, or 2, and preferably 1. X is a moisture-hydrolyzable group, such as an alkoxy group, diorganoketo-oxime group, alkoxy group, acyloxy group, mono-organoamino group, diorganoamino group, N-organoacylamino group, N,N-diorganohydroxyamino group, and alkenyloxy group. Specific examples include methoxy, ethoxy, propoxy, dimethylketo-oxime, methyl ethyl keto-oxime, methoxyethoxy, acetoxy, N-butylamino, methylacetamide, N,N-diethylhydroxyamino, and propenoxy. $R^5$ is a substituted or unsubstituted monovalent hydrocarbon group comprising 1 to 8 carbons, and e is 0, 1, or 2. Specific examples of $R^5$ include alkyl groups such as methyl, ethyl, tert-butyl, 2-ethylhexyl, dodecyl, and octadecyl; alkenyl groups such as vinyl and allyl; cycloalkyl groups such as cyclopentyl and cyclohexyl; cycloalkenyl groups such as cyclopentenyl and cyclohexenyl; aryl groups such as phenyl and naphthyl; aralkyl groups such as benzyl, phenylethyl, and xylyl; alkaryl groups such as tolyl and dimethylphenyl; halogenated hydrocarbon groups such as chloromethyl, chloropropyl, 3,3,3-trifluoropropyl, and the $F(CF_2)_a CH_2CH_2$— group where a is defined the same as above. Of these, the methyl group and vinyl group are preferred.

Component (b-3) is usually contained in an amount of 0.5 to 90 weight parts per 100 weight parts of component (a-3), with a range of 1 to 80 weight parts being preferred. This is because the resulting silicone rubber composition will not cure sufficiently if component (b-3) is contained in an amount less than 0.5 weight part per 100 weight parts of component (a-3), and the physical strength of the resulting silicone rubber composition will suffer if this amount exceeds 90 weight parts. For these compositions, long-term storage in the absence of moisture is possible. The amount of hydroxyl groups or hydrolyzable groups bonded to silicon atoms in component (a-3), and the content of the moisture-hydrolyzable groups X in component (b-3) is selected such that in the present of moisture the composition cures at room temperature.

The reinforcing filler that is component (c-3) is the same as component (c-1) described for the above-mentioned addition reaction-curing silicone rubber composition, and examples thereof are the same.

Component (d-3) is a catalyst for curing the composition of the present invention by promoting the condensation reaction of component (a-3) and component (b-3). Catalysts that promote a condensation reaction, which are used in the dehydration condensation of silanol groups, are usually effective as this catalyst. Specific examples include dibutyltin acetate, dibutyltin laurate, dibutyltin dioctoate, stannous octoate, stannous naphthenate, stannous oleate, stannous isobutyrate, stannous linoleate, stannous stearate, stannous benzolate, stannous naphthoate, stannous laurate, stannous ortho-thymate, stannous β-benzoylpropionate, stannous crotonate, stannous tropate, stannous p-bromobenzoate, stannous palmito-oleate, stannous cinnamate, stannous phenylacetate, and other such tin salts of carboxylic acids, as well as iron salts and manganese salts of these carboxylic acids, or cobalt salt-tetraalkyl titanate-dialkyl titanate complex salt organosiloxytitanates. This component (d-3) should be selected as dictated by the type of moisture-hydrolyzable groups of component (b-3). The amount in which this component is contained is usually between 0.01 and 20 weight parts per 100 weight parts of component (a-3).

The silicone rubber composition of the present invention can be easily manufactured by uniformly mixing the above-mentioned components (a-1) to (d-1), components (a-2) to (d-2), or components (a-3) to (d-3) in a kneader-mixer, Banbury mixer, double-roll mixer, or the like. A silicone rubber composition composed of components (a-1) to (d-1), components (a-2) to (d-2), or components (a-3) to (d-3) may be manufactured in advance and the above-mentioned perfluoroalkyl group-containing polydiorganosiloxane added to it, or the perfluoroalkyl group-containing polydiorganosiloxane may be added in the course of manufacturing the silicone rubber composition.

In order to further enhance lubricity, it is preferable for the silicone rubber composition of the present invention to contain a fluoro-resin powder. Examples of fluoro-resin powders include tetrafluoroethylene resin powder, trifluorochloroethylene resin powder, tetrafluoroethylene hexafluoroethylenepropylene resin powder, vinyl fluoride resin powder, vinylidene fluoride resin powder, and difluorodichloroethylene resin powder. The amount in which the fluoro-resin powder is added is adjusted as needed, but a preferable range is from 0.1 to 50 wt % with respect to the combined amount of silicone rubber composition composed of components (a-1) to (d-1), components (a-2) to (d-2), or components (a-3) to (d-3). When this fluoro-resin powder is added, the above-mentioned perfluoroalkyl group-containing polydiorganosiloxane acts to enhance the dispersibility of the fluoro-resin powder in the silicone rubber composition. Accordingly, an advantage is that water repellency and lubricity can be imparted without diminishing the cohesion or dispersion of the fluoro-resin powder.

The silicone rubber composition used in the present invention is composed of components (a-1) to (d-1), components (a-2) to (d-2), or components (a-3) to (d-3), but as long as the object of the present invention is not compromised, various other known additives for silicone rubbers may be added to these compositions such as carbon black powder, calcium carbide powder, quartz powder, talc powder, titanium oxide powder, aluminum oxide powder, glass fibers, asbestos, organic resin fibers, and other such semi-reinforcing fillers, as well as non-reinforcing fillers, internal release agents, plasticizers, adhesion promoters, coloring agents, and pigments.

The silicone rubber composition of the present invention as described above becomes a silicone rubber with excellent water and oil repellency after curing, and is therefore useful as a silicone rubber composition in applications where these characteristics are required, such as the rubber inserts of automobile wiper blades, keyboard rubber members, and so forth.

The present invention will now be described in further detail through working examples. In these examples, viscosity is the value measured at 25° C. The plasticity of the silicone rubber compositions was measured according to the physical testing method for unvulcanized rubber set forth in JIS K 6300. The contact angle of the silicone rubber with water and with hexadecane was measured using an automatic contact angle measurement apparatus (made by Kyowa Kaimen Kagaku). All parts described in the examples are by weight.

Working Example 1. 100 Parts of a dimethylvinylsiloxy group-terminated dimethylsiloxane.methylvinylsiloxane copolymer (average degree of polymerization: 7000) comprising 99.5 mol % dimethylsiloxane and 0.5 mol % methylvinylsiloxane, 35 parts of fumed silica with a BET specific surface area of 300 $m^2/g$, 5 parts of fumed silica with a BET specific surface area of 200 $m^2/g$, and 13 parts of dimethylpolysiloxane terminated at both ends of the chain with silanol groups and having a viscosity of 40 mPa·s were put into a kneader-mixer and mixed until uniformly blended. This mixture was then heated for 2 hours at 120° C. to obtain a silicone rubber base. To 100 parts of this silicone rubber base were added 3 parts of a perfluoroalkyl group-containing polydiorganosiloxane described by formula (Chemical Formula 10)

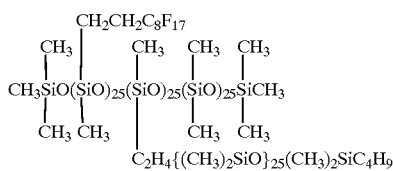

and 0.5 part of 2,5-dimethyl-2,5-di(tert-butyl peroxy) hexane, and these components were mixed to obtain a silicone rubber composition. The silicone rubber composition thus obtained was compression molded for 10 minutes at 170° C. and a pressure of 30 kg/cm² to obtain a silicone rubber sheet with a thickness of 2 mm. This sheet was heated in an oven for 4 hours at 200° C. to complete the curing. The contact angle of the surface of the silicone rubber thus obtained with water and with hexadecane ($C_{16}H_{34}$) was measured, the results of which are given in Table 1. Similarly, silicone rubber compositions were prepared in the same manner as above except that the amount in which the perfluoroalkyl group-containing polydiorganosiloxane was added was changed to 1 part and 2 parts. Silicone rubber sheets were then produced in the same manner as above. The properties of these sheets were measured in the same manner as above and the results are given in Table 1.

Comparative Example 1. A silicone rubber composition was prepared in the same manner as in Working Example 1 except that the perfluoroalkyl group-containing polydiorganosiloxane was not added. A silicone rubber sheet was produced, the contact angle of this silicone rubber sheet with water and with hexadecane was measured as described in Working Example 1, and the results are given in Table 1.

Working Example 2. 100 Parts of a dimethylsiloxane.methylvinylsiloxane copolymer terminated with dimethylvinylsiloxy groups (vinyl group content: 0.8 wt %) with a viscosity of 2000 mPa·s, 3 parts methylhydrogenpolysiloxane terminated with a trimethylsiloxy group and with a viscosity of 20 mPa·s, 30 parts of fumed silica with a BET specific surface area of 180 m²/g whose surface had undergone a hydrophobic treatment with hexamethyldisilazane, and 2 parts of a perfluoroalkyl group-containing polydiorganosiloxane descried by formula:

(Chemical Formula 11)

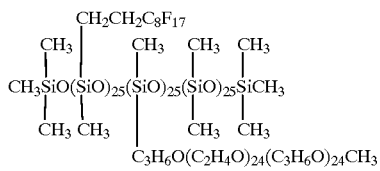

were put into a kneader-mixer and mixed until uniformly blended. This product was then heated for 2 hours at 100° C. to obtain a silicone rubber base. 0.9 Part methylbutynol was uniformly mixed into 148 parts of this silicone rubber base. Next, a silicone rubber composition was prepared by uniformly mixing this base with an isopropyl alcohol solution of chloroplatinic acid in an amount such that the metallic platinum in the chloroplatinic acid accounted for 50 ppm with respect to the above-mentioned dimethylsiloxane.methylvinylsiloxane copolymer. The silicone rubber composition thus obtained was cured in the same manner as in Working Example 1 to obtain a silicone rubber sheet. The contact angle of the surface of this silicone rubber sheet with water was measured and the results are given in Table 2. Similarly, a silicone rubber composition was prepared in the same manner as above except that the amount in which the perfluoroalkyl group-containing polydiorganosiloxane was added was changed to 1 part. A silicone rubber sheet was then produced in the same manner as above. The properties of these sheets were measured in the same manner as above, the results of which are given in Table 2.

Comparative Example 2. A silicone rubber composition was prepared in the same manner as in Working Example 2 except that the perfluoroalkyl group-containing polydiorganosiloxane was not added. A silicone rubber sheet was then produced. The contact angle of this silicone rubber sheet with water was measured and the results are given in Table 2.

Working Example 3. 100 Parts of a silanol group-terminated dimethylpolysiloxane with a viscosity of 2000 mPa·s, 15 parts of fumed silica with a BET specific surface area of 180 m²/g whose surface had undergone a hydrophobic treatment with hexamethyldisilazane, and 3 parts of a perfluoroalkyl group-containing polydiorganosiloxane described by formula:

(Chemical Formula 12)

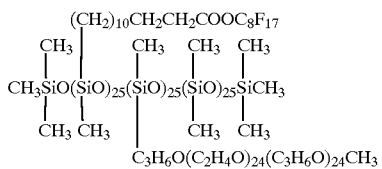

were put into a kneader-mixer and mixed until uniformly blended. This product was then heated for 2 hours at 100° C. to obtain a silicone rubber base. A silicone rubber composition was prepared by uniformly mixing 125 parts of this silicone rubber base with 7 parts methyltrimethoxysilane and 1.5 parts tetrabutyl titanate. The silicone rubber composition thus obtained was put into a sheet mold and left for 2 weeks at room temperature, which yielded a silicone rubber sheet with a thickness of 2 mm. The contact angle of this silicone rubber sheet with water was measured, the results of which are given in Table 3. Silicone rubber compositions were prepared in the same manner as above except that the amount in which the perfluoroalkyl group-containing polydiorganosiloxane was added was changed to 1 part and 2 parts. Silicone rubber sheets were then produced in the same manner as above. The properties of these sheets were measured in the same manner as above, the results of which are given in Table 3.

Comparative Example 3. A silicone rubber composition was prepared in the same manner as in Working Example 3 except that the perfluoroalkyl group-containing polydiorganosiloxane was not added. A silicone rubber sheet was then produced in the same manner. The contact angle of this sheet with water was measured, the results of which are given in Table 3.

TABLE 1

| Experiment No. | Perfluoroalkyl group-containing Polydiorganosiloxane content (parts) | Contact angle (parts) | |
| --- | --- | --- | --- |
| | | Water | Hexadecane |
| Working Example 1 | 1 | 3 | 112 | 28 |
| | 2 | 2 | 110 | 27 |
| | 3 | 1 | 110 | 25 |
| Comp. Ex. 1 | 4 | 0 | 107 | 20 |

TABLE 2

| Experiment No. | Perfluoroalkyl group-containing Polydiorganosiloxane content (parts) | Contact angle (parts) |
| --- | --- | --- |
| Working Example 2 | 5 | 2 | 109 |
| | 6 | 1 | 108 |
| Comp. Ex. 2 | 7 | 0 | 106 |

TABLE 3

| Experiment No | Perfluoroalkyl group-containing Polydiorganosiloxane content (parts) | Contact angle (parts) |
| --- | --- | --- |
| Working Example 3 | 8 | 3 | 119 |
| | 9 | 2 | 116 |
| | 10 | 1 | 110 |
| Comp. Ex. 3 | 11 | 0 | 108 |

Working Example 4. 100 Parts of a dimethylvinylsiloxy group-terminated dimethylsiloxane.methylvinylsiloxane copolymer (average degree of polymerization: 7000) composed of 99.5 mol % dimethylsiloxane and 0.5 mol % methylvinylsiloxane, 35 parts of fumed silica with a BET specific surface area of 300 m$^2$/g, 5 parts of fumed silica with a BET specific surface area of 200 m$^2$/g, and 13 parts of a dimethylsiloxane oligomer terminated at both ends of the chain with silanol groups and having a viscosity of 40 mPa·s were put into a kneader-mixer and mixed until uniformly blended. This mixture was then heated for 2 hours at 120° C. to obtain a silicone rubber base. To 100 parts of this silicone rubber base were added 1 part of a perfluoroalkyl group-containing polydiorganosiloxane described by formula:

(Chemical Formula 13)

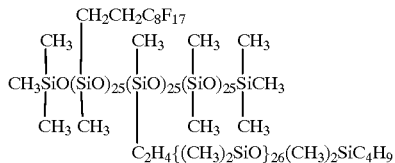

2 parts tetrafluoroethylene resin powder (trade name: Teflon 6CJ, made by Mitsui Dupont Fluorochemical), and 0.5 part 2,5-dimethyl-2,5-di(tert-butyl peroxy)hexane, and these components were mixed until uniformly blended with a double-roll mixer to obtain a silicone rubber composition. The plasticity of this silicone rubber composition was 385. A sheet was formed between the two rolls spaced 9 mm apart, and this sheet was allowed to stand for 3 hours, after which it was cut into a circular shape with a cylindrical punching blade (11 cm in diameter) used for measuring milling shrinkage. This piece of the sheet weighed 88 g. The curable silicone rubber composition obtained above was also compression molded for 10 minutes at 170° C. and a pressure of 30 kg/cm$^2$ to obtain a silicone rubber sheet with a thickness of 2 mm. This sheet was heated in an oven for 4 hours at 200° C., and the resulting sheet had good transparency.

Comparative Example 4. A silicone rubber composition was prepared in the same manner as in Working Example 4 except that the perfluoroalkyl group-containing polydiorganosiloxane was not added. The plasticity of this silicone rubber composition was 399. A sheet was formed between two rolls spaced 9 mm apart, and this sheet was allowed to stand for 3 hours, after which it was cut into a circular shape with a cylindrical punching blade (11 cm in diameter) used for measuring milling shrinkage. This piece of the sheet weighed 94 g. Compared to the silicone rubber composition obtained in Working Example 4 above, the milling shrinkage was greater, that is, there was more change in the silicone rubber composition sheet over time, the shrinkage of the silicone rubber composition sheet was greater, and the shape retention was inferior. This silicone rubber composition was cured in the same manner as in Working Example 4 to produce a silicone rubber sheet, whereupon the transparency of the sheet was inferior to the transparency of the silicone rubber sheet produced in Working Example 4.

Comparative Example 5. A silicone rubber composition was prepared in the same manner as in Working Example 1 except that a γ-trifluoropropyl group-containing polydiorganosiloxane described by the following formula and discussed in Japanese Laid-Open Patent Application H9-226529 was added instead of the perfluoroalkyl group-containing polydiorganosiloxane used in Working Example 1. A silicone rubber sheet was then produced. The contact angle of this silicone rubber sheet with water was measured and found to be 108°.

(Chemical Formula 14)

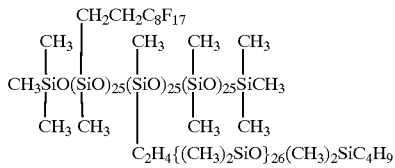

We claim:

1. A silicone rubber composition comprising an addition reaction curing silicone rubber, a peroxide curing silicone rubber, or a condensation curing silicone rubber, containing 0.01 to 50 weight percent of a perfluoroalkyl group containing polydiorganosiloxane with a weight average molecular weight of at least 1000, and having a formula selected from the group consisting of:

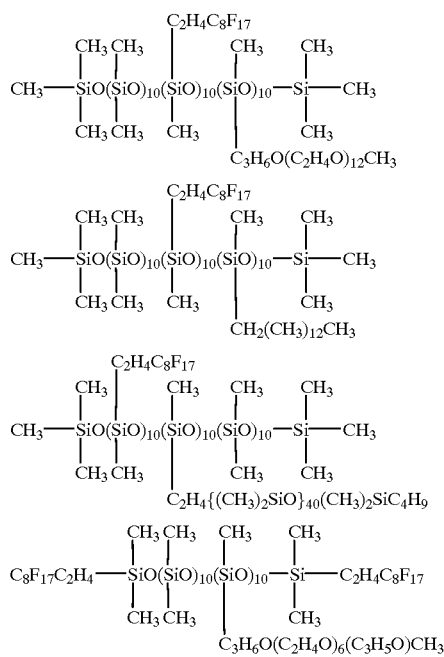
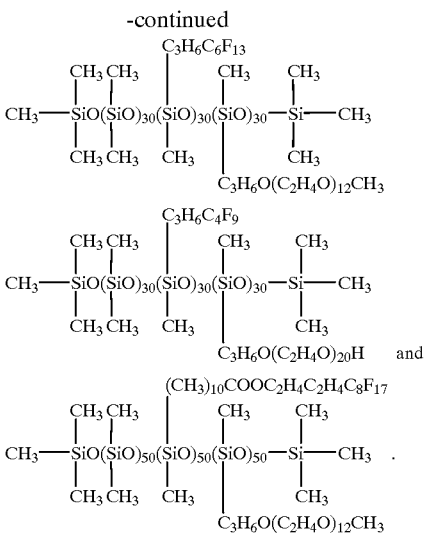
2. An article of manufacture prepared by curing the silicone rubber composition of claim 1.
* * * * *